United States Patent

Yagi et al.

Patent Number: 5,882,518
Date of Patent: Mar. 16, 1999

[54] MICROPOROUS FILM OF HIGH MOLECULAR WEIGHT POLYOLEFIN AND PROCESS FOR PRODUCING SAME

[75] Inventors: Kazuo Yagi; Hitoshi Mantoku; Akinao Hashimoto, all of Kuga-gun, Japan

[73] Assignee: Mitsui Chemicals, Inc., Tokyo, Japan

[21] Appl. No.: 683,221

[22] Filed: Jul. 18, 1996

[30] Foreign Application Priority Data

Jul. 18, 1995 [JP] Japan .................................... 7-181467
Oct. 24, 1995 [JP] Japan .................................... 7-298931

[51] Int. Cl.$^6$ .................................................. B01D 39/00
[52] U.S. Cl. ............................ 210/500.36; 210/500.27; 56/4; 264/41
[58] Field of Search ................................ 210/500.36, 650, 210/500.23; 96/4; 428/284; 264/49, 210.3, 211.4, 211.15, 41

[56] References Cited

U.S. PATENT DOCUMENTS

| | | | |
|---|---|---|---|
| 3,376,238 | 4/1968 | Gregorian | 260/2.5 |
| 3,839,516 | 10/1974 | Williams et al. | 260/2.5 |
| 3,954,927 | 5/1976 | Duling et al. | 264/49 |
| 4,778,601 | 10/1988 | Lopatin et al. | 210/500.36 |
| 4,828,772 | 5/1989 | Lopatin et al. | 264/45.9 |
| 5,051,183 | 9/1991 | Takita et al. | 210/500.36 |
| 5,055,248 | 10/1991 | Motooka et al. | 264/210.6 |
| 5,106,563 | 4/1992 | Yagi et al. | 264/210.7 |
| 5,169,712 | 12/1992 | Tapp | 428/315.1 |
| 5,208,098 | 5/1993 | Stover | 428/284 |

FOREIGN PATENT DOCUMENTS

| | | | |
|---|---|---|---|
| 0193318 | 9/1986 | European Pat. Off. | 210/500.36 |
| 60-255107 | 12/1985 | Japan . | |
| 6-16862 | 1/1994 | Japan . | |

*Primary Examiner*—Ana Fortuna
*Attorney, Agent, or Firm*—Sherman and Shalloway

[57] ABSTRACT

A microporous film of high molecular weight polyolefin useful in the prepration of filter mediums or non-aqueous battery separators and a process for producing the film are disclosed. The microporous film of high molecular weight polyolefin contains leaf vein-like fibrils as a main constituent on each of which fibrils indeterminate-form crystallites of not more than 1 μm in size flocculate and has an intrinsic viscosity, [η], of 4 dl/g or more and, preferably, has:

(a) a void content of 25% or more;
(b) a gas permeability of 1900 sec/100 cc or less;
(c) a tensile strength of 0.05 GPa or more; and
(d) a gas impermeability-acquiring temperature of 140° C. or lower. The microporous film is produced by subjecting a high molecular weight, biaxially oriented polyolefin film of 60% or more in crystallinity to a heat treatment and, if necessary, to a stretch treatment to thereby melt or dissolve the indeterminate-form portion of the film, then crystallizing it onto the fibrils as crystallites.

12 Claims, 6 Drawing Sheets

5,882,518

MICROPOROUS FILM OF HIGH MOLECULAR WEIGHT POLYOLEFIN AND PROCESS FOR PRODUCING SAME

BACKGROUND OF THE INVENTION

This invention relates to a microporous film of high molecular weight polyolefin useful in the preparation of filter mediums or non-aqueous battery separators and to a process for producing the film. More particularly, it relates to a microporous film of high molecular weight polyolefin, which contains vein-like fibrils as a main constituent on each of which fibrils crystallites flocculate and to a process for producing the microporous film of high molecular weight polyolefin, which comprises subjecting a gas-impermeable film to a heat treatment and, if necessary, to a stretch treatment to thereby render the film microporous.

Many processes for producing microporous films of high molecular weight polyolefins have so far been proposed as can be seen in, for example, Japanese Examined Patent Publication Nos. 6-53826, 6-2841 and 7-17782.

According to these processes, microporous films are produced by adding a plasticizer composed of a low molecular weight compound such as a hydrocarbon solvent (e.g., decane, dodecane, decalin, paraffin oil or mineral oil), a fatty acid or its aliphatic hydrocarbon derivative (e.g., a fatty acid ester or an aliphatic alcohol), a paraffin wax, or dioctyl phthalate or dibutyl sebacate to a high molecular weight polyolefin forming the mixture into a film, then removing said low molecular weight compound from the film.

Further, according to the processes proposed by Japanese Examined Patent Publication Nos. 6-53826 and 6-2841, the film from which the low molecular compound has been removed is stretched.

However, the microporous films produced by Japanese Examined Patent Publication Nos. 6-53826 and 6-2841 undergo closing of the micropores only when heated up to a temperature of about the melting point of the film (poor closing properties) or, in some cases, the micropores do not disappear at a temperature lower than the melting point.

As a process for improving the closing properties, there have been proposed, for example, a microporous film produced by using a composition having a wide molecular weight distribution prepared by adding, to an ultra-high molecular weight polyethylene, a polyethylene having a molecular weight lower than that of the ultra-high molecular weight polyethylene (Japanese Unexamined Patent Publication No. 3-105851) and a process of melt stretching (draft) a composition of an ultra-high molecular weight polyethylene and a plasticizer into a film.

The microporous film disclosed by Japanese Examined Patent Publication No. 7-17782, however, has a poor strength in comprarison with other microporous films obtained by the aforesaid processes due to not having been stretched, though it undergoes closing of micropores when heated to a temperature lower than its melting point. In addition, the microporous film obtained by the process disclosed in Japanese Unexamined Patent Publication No. 3-105851 has a similarly poor strength due to the presence of a large quantity of low molecular weight polyethylene and, in some uses, might be broken.

On the other hand, as a process for producing a microporous film without adding any low molecular weight compound, there have been proposed processes described in Japanese Examined Patent Publication Nos. 6-18915 and 2-19141. These processes include stretching of film to render it microporous as a necessary step, and use a polyethylene having a molecular weight as low as 0.2 to 20 g/10 min in terms of MFR, thus providing microporous films having a tensile strength of up to 0.02 GPa or, at the highest, 0.03 GPa which limits the industrial use thereof.

As a result of various investigations to obtain a microporous film having a high strength without adding any low molecular weight compound which serves to render the film microporous but requires a subsequent step of removing itself from the formed film, the inventors have found that a microporous film obtained by subjecting a specific high molecular weight polyolefin film to a heat treatment and, if necessary, a stretch treatment posesses enough high strength and closing properties, thus having achieved the present invention.

SUMMARY OF THE INVENTION

An object of the present invention is to provide a microporous film of high molecular weight polyolefin, which is obtained by subjecting a specific high molecular weight polyolefin film to a heat treatment and, if necessary, a stretch treatment under specific conditions and which contains leaf vein-like fibrils as a main constituent on each of which fibrils crystallites flocculate to impart excellent strength and closing properties to the film.

Another object of the present invention is to provide a process for producing a microporous film of high molecular weight polyolefin without adding any low molecular weight compound and yet having no less mechanical properties than that of conventional microporous film of high molecular weight polyolefin obtained by adding low molecular weight compounds, thus allowing to select parameters such as pore size, gas permeability and void content with less limitation.

These and other objects and features of the invention will become apparent from the claims and from the following description when read in conjunction with the accompanying drawings.

Figure 1:
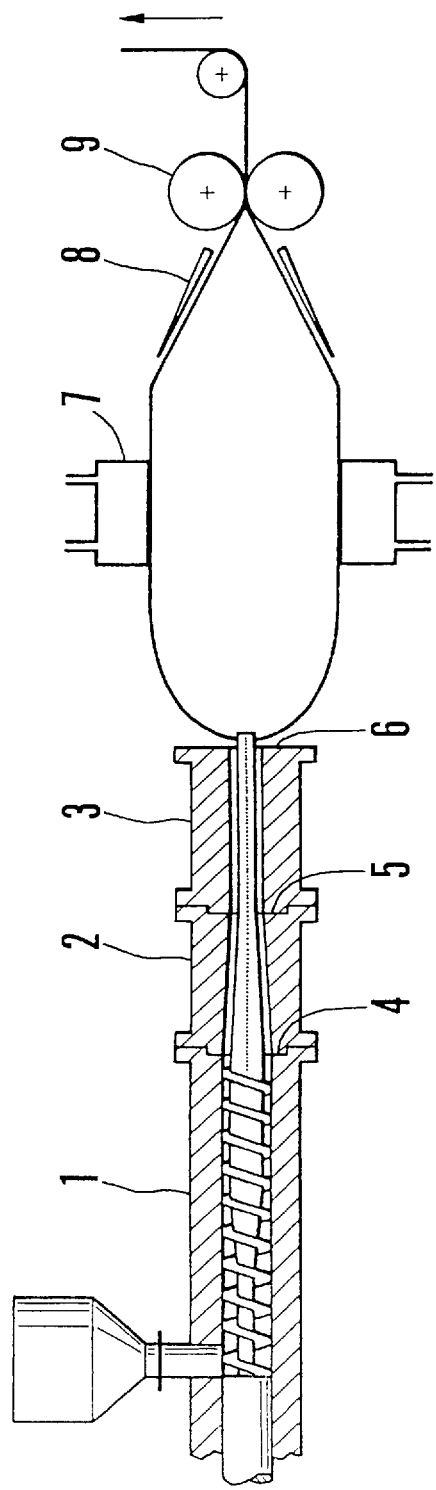
FIG. 1 is a front sectional view showing one example of an apparatus for producing the precursor of a porous film in accordance with the present invention.

In these drawings, numeral 1 designates an extruder, 5 a mandrel, and 7 a die.

DETAILED DESCRIPTION OF PREFERRED EMBODIMENTS OF THE INVENTION

The present invention is proposed to attain the above-described objects. According to the present invention, there are provided a microporous film of high molecular weight polyolefin containing leaf vein-like fibrils as a main constituent on each of which fibrils indeterminate crystallites of not more than 1 μm in size flocculate and having an intrinsic viscosity, [η], of 4 dl/g or more and a process of producing the microporous film of high molecular weight polyolefin by subjecting a high molecular weight, biaxially oriented polyolefin film of 60% or more in crystallinity to a heat treatment and, if necessary, to a stretch treatment to thereby melt or dissolve the amorphous portion of the film, then crystallizing it onto the fibrils as crystallites.

The term "size" of indeterminate crystallites means an average size obtained by measuring the crystallites in two directions crossing at right angles to each other. Measurement of the size is conducted by directly measuring electron micrographed crystallites at a magnification permitting the measurement.

That is, according to the present invention, there is provided a microporous film of high molecular weight polyolefin containing leaf vein-like fibrils as a main constituent on each of which fibrils indeterminate-form crystallites of not more than 1 μm in size flocculate and having an intrinsic viscosity, [η], of 4 dl/g or more Further, according to this invention, there is provided a microporous film of high molecular weight polyolefin having an intrinsic viscosity, [η], of 4 dl/g or more and having:

(a) a void content of 25% or more;
(b) a gas permeability of 1900 sec/100 cc or less;
(c) a tensile strength of 0.05 GPa or more; and
(d) a gas impermeability-acquiring temperature of 140° C. or lower.

Still further, according to this invention, there is provided a microporous film of high molecular weight polyolefin having a tensile strength of 0.05 GPa or more, which is obtained by subjecting a gas-impermeable, polyolefin precursor film having an intrinsic viscosity, [η], of 4 dl/g or more and having substantially no plasticizers and/or solvents to heat treatment to render it microporous.

Still further, according to this invention, there is provided the above-described microporous film of high molecular weight polyolefin wherein said heat treatment is followed by a stretch treatment.

Still further, according to this invention, there is provided the above-described microporous film of high molecular weight polyolefin wherein said gas impermeable film is a biaxially oriented film having a crystallinity of 60% or more.

Still further, according to this invention, there is provided the above-described microporous film of high molecular weight polyolefin wherein said gas impermeable film is a film obtained by inflation method.

Still further, according to this invention, there is provided the above-described microporous film of high molecular weight polyolefin wherein said high molecular weight polyolefin is a high molecular weight polyethylene.

Still further, according to this invention, there is provided a process of producing the microporous film of high molecular weight polyolefin by subjecting a gas impermeable polyolefin precursor film having an intrinsic viscosity, [η], of 4 dl/g or more and having substantially no plasticizers and/or solvents to a heat treatment to thereby render the film microporous.

Still further, according to this invention, there is provided the above-described process of producing the microporous film of high molecular weight polyolefin, wherein said heat treatment is followed by a stretch treatment.

Still further, according to this invention, there is provided the above-described process of producing the microporous film of high molecular weight polyolefin, wherein said gas impermeable film is a biaxially oriented film having a crystallinity of 60% or more.

Still further, according to this invention, there is provided the above-described process of producing the microporous film of high molecular weight polyolefin, wherein said gas impermeable film is a film obtained by inflation method.

Still further, according to this invention, there is provided the above-described process of producing the microporous film of high molecular weight polyolefin, wherein said heat treatment is conducted in a constrained state.

Still further, according to this invention, there is provided the above-described process of producing the microporous film of high molecular weight polyolefin, wherein said heat treatment is conducted so that indeterminate-form portions of the polyolefin is selectively molten or dissolved and then crystallize as crystallite which flocculates on each of remaining crystals of leaf vein-like fibrils.

Still further, according to this invention, there is provided the above-described process of producing the microporous film of high molecular weight polyolefin, wherein said heat treatment is conducted in a first liquid having a boiling point higher than the heat-treating temperature and being capable of selectively melting or dissolving indeterminate-form portions of the polyolefin.

Still further, according to this invention, there is provided the above-described process of producing the microporous film of high molecular weight polyolefin, wherein said heat treatment is conducted so that the film can shrink only within 10% in both the longitudinal and the transverse directions.

Still further, according to this invention, there is provided the above-described process of producing the microporous film of high molecular weight polyolefin, wherein said heat treatment conducted in the first liquid is followed by dipping the polyolefin film in a second liquid having enough compatibility with the first liquid, having a boiling point lower than that of the first liquid and having a poor affinity for the polyolefin and drying.

Still further, according to this invention, there is provided the above-described microporous film of high molecular weight polyolefin, wherein said gas-impermeable film is of a high molecular weight polyolefin other than polyethylene and is a biaxially oriented film having a crystallinity of 40% or more.

Still further, according to this invention, there is provided the above-described process of producing the microporous film of high molecular weight polyolefin, wherein said first liquid is a hydrocarbon series liquid.

In the present invention, the phrase "leaf-vein like fibrils" means fibrils constituting the film have a thick trunk fiber and thin fibers branched out from the trunk; said thin fibers forming a complicated network structure.

The process of the present invention for producing the microporous film of high molecular weight polyolefin will be described below with respect to starting materials, process for preparing non-treated film, process for treating the film, and the features of resulting film.

[Starting Materials]

The high molecular weight polyolefins to be used in the present invention are those which are obtained, for example, by slurry polymerization of one of, or a combination of plural kinds of, ethylene, propylene and α-olefins containing 4 to 8 carbon atoms using a Ziegler catalyst. Preferable copolymers are copolymers of ethylene and a small amount of propylene or copolymers of ethylene and one of, or a combination of plural kinds of, α-olefins containing 4 to 8 carbon atoms.

With the polyethylene copolymers, the content of comonomer or comonomers is preferably up to 5 mol %. Of these polymers, ethylene homopolymers are particularly preferred.

The polyolefins generally have, upon formation of inflation film an intrinsic viscosity, [η], of 4 dl/g or more, preferably 4 to 25 dl/g are used. In particular, for the purpose of obtaining highly strong microporous films, polyolefins having an intrinsic viscosity, [η], of from 5 dl/g to 20 dl/g are preferred, with 8 to 20 dl/g being more preferred.

Polyolefins having an intrinsic viscosity, [η], of more than 25 dl/g show too high melt viscosity upon forming non-treated films, thus showing poor inflation formability, as will be described hereinafter.

[Precursor or Non-treated Film]

The gas impermeable film obtained by inflation method from the polyolefin substantially comprises polyolefin.

By "substantially comprises polyolefin" is meant that a starting polyolefin does not have added thereto a large amount of solvents or plasticizers upon forming into a film by inflation. Therefore, the polyolefin is permitted to contain various additives ordinarily used for polyolefins (e.g., heat resistance-imparting agents, weathering stabilizers, lubricants, antiblocking agents, slipping agents, pigments, dyes, etc.) within the range not spoiling the objects of this invention, with the upper limit being preferably up to 10% in all, more preferably up to 5%.

Of the polyolefins, those of less than 5 dl/g in intrinsic viscosity, [η], can be formed into a film by ordinary inflation method.

As the inflation method, there are illustrated those general processes employed for polyethylene or polypropylene and described in detail in "Extrusion Molding of Plastics and its Application" written by Keiji Sawada and published by Seibundo Shinko-sha in 1966, volume 4, chapter 2.

In comparison with inflation method, T-die method provides a uniaxially orientated film when melt stretching is employed, and hence films prepared by T-die method must be subjected to an after-treatment to attain biaxial orientation. However, inflation method enables biaxial orientation by properly selecting blow-up ratio upon inflation.

As preferred conditions to be employed upon forming the precursor or non-treated film, draft ratio and blow-up ratio be large. The draft ratio is a ratio of the flow-out rate of film-forming resin at the outlet of lip of inflation die to the take-up rate of cold-set tube film, and the blow-up ratio is a ratio of the diameter of cold-set tube film to the average diameter of inflation die. Usually, the draft ratio is properly adjusted in the range of not smaller than 2, with not smaller than 3 being preferred, and the blow-up ratio is properly adjusted in the range of 1.1 to 20.

When using a high molecular weight polyolefin having an intrinsic viscosity, [η], of from 5 dl/g to 25 dl/g, the non-treated film can be obtained in the following manner.

That is, a high molecular weight polyolefin is molten in a screw extruder, and extruded through a tube die having L/D of at least 5 and having a mandrel rotating dependently on, or independently from, the screw. Thereafter, a gas is introduced into the inside of the molten state tubular film to blow at a blow-up ratio of 1.1 to 20, followed by cooling to obtain the intended precursor or non-treated film.

The draft ratio is preferably 5 or more, particularly preferably 8 or more. The blow-up ratio is preferably 5 or more, particularly 8 or more.

In the above description, L designates the length of tube die constituted by a mandrel and an outer die, and D designates clearance between the mandrel and the outer die, that is, thickness of the die lip. Embodiments of the inflation apparatus are described in detail in Japanese Examine Patent Publication No. 6-55433 filed by the applicant.

In every process, there are obtained a gas impermeable non-treated precursor films having an intrinsic viscosity, [η], of 4 to 25 dl/g, being biaxially stretched, a crystallinity of preferably not less than 60%, more preferably 60 to 70%, tensile strength in the machine direction of 0.04 GPa or more and 0.04 GPa or more in the cross machine direction, and a moisture permeability coefficient of 0.45 g mm/m$^2$ 24 hr under the conditions of 40° C. in temperature and 90% in relative humidity. By "gas impermeable film" is meant a film having a gas permeability of 10,000 sec/100 cc or more determined by the gas permeability test to be described hereinafter. The precursor or non-treated film is not particularly limited as to thickness but, in view of handling convenience in the subsequent treating step, the film has a thickness of preferably 5 to 500 μm, more preferably 5 to 100 μm.

Crystallinity of the precursor or non-treated film determined from the heat of crystal fusion measured by means of a differential scanning calorimeter (DSC) is preferably 60% or more, more preferably 60 to 70% when the film is made of polyethylene, and crystallinity of the precursor film made of polyolefin other than polyethylene is preferably 40% or more, more preferably 50% or more.

With precursor films obtained by the above-described inflation method having a crystallinity of less than 60% (polyethylene films) or less than 40% (other polyolefin films), there might result no microporous films having a void content of 30% or more when they are rendered microporous according to the present invention. In such case, it is an preferred embodiment to impart a crystallinity of 60% or more by subjecting the film to a preliminary heat treatment under an atmosphere of a gas (air) prior to the heat treatment of the present invention.

The precursor or non-treated film of the present invention is preferably biaxially oriented. The biaxially oriented film is in such state that either axis a or b other than axis c corresponding to the molecular chain of each polyolefin unit crystal of the film is mainly vertical to the film surface, with other axis, for example, axis c being distributed almost in a non-oriented manner with respecto to the film surface. With polyethylene, the axis vertical to the film surface is usually axis a and, with other polyolefins, the axis being usually axis b.

This state can be identified in the following manner using an X-ray diffraction apparatus. That is, when a polyolefin film in such state is arranged in an equatorial direction from the end of the film and irradiated with X-rays to measure a diffraction pattern, it shows an orientation coefficient of fa (with polyethylene films) or fb (with other polyolefin films) of at least 0.2 and, when arranged so that the machine direction of the film coincides with the meridian direction and irradiated with X-rays in the through direction to view the diffraction pattern, it shows an orientation coefficient of fc of −0.2 to 0.2.

Manner and method of determining and calculating the orientation coefficients of fa, fb and fc are as described in "X-Ray Diffraction of Polymers (I)" written by Leroy E. Alexander, translated under the general supervision of Ichiro Sakurada, and published by Kagaku-Dojin, in the section describing selective orientation.

Precursor films showing an fc of more than 0.2 (c-axis oriented state) or an fa of less than 0.2 might not be rendered microporous by the heat treatment even when they satisfy the aforesaid conditions with respect to crystallinity.

Additionally, precursor films having an intrinsic viscosity, [η], of less than 4.0 dl/g might be insufficient with respect to tensile strength, though they may be rendered microporous under some conditions.

[Heat Treatment]

The heat treatment of the above-described precursor films may be conducted in the following manner, though it depends upon the ambient atmosphere. For example, a polyethylene precursor film is usually treated at a temperature of from 100° to 145° C. for 1 minute or longer to increase crystallinity after the treatment by 10 to 20% in comparison with that before the treatment. In this situation, the precursor film is fixed at least in one direction, most preferably in two directions crossing at right angles, to prevent shrinkage. Where some shrinkage is unavoidable, allowable shrinkage is 10% or less in the longitudinal and transverse directions.

Precursor films having a crystallinity of 60% or more may preferably be heat treated to increase the crystallinity for acquiring a high void content after the film being rendered microporous.

An alternative operation for enhancing crystallinity of the film may be a heat treatment together with stretching.

When the precursor film is fixed in two directions crossing at right angles, it is rendered microporous by the above-described treatment. In the case of using the specific first liquid to be described hereinafter, a microporous film is obtained by drying the treated film while keeping the film in the fixed state.

In the treatment of the precursor film for rendering it microporous, it has been found that the intrinsic viscosity scarcely changes and, if there is any change, only within measurement error.

The atmosphere in which the heat treatment is conducted may be the air but, preferably, the treatment be conducted in the first liquid having a proper affinity for the high molecular weight polyolefin. By "having a proper affinity for the high molecular weight polyolefin" is meant that, when the precursor film of high molecular weight polyolefin is formed and immersed in the first liquid at the treating temperature, the first liquid does not act on crystalline portions of the precursor film but mainly penetrates into indeterminate-form portions to selectively melt or dissolve and, upon cooling, allow part of the molten or dissolved indeterminate-form portions to crystallize, thus the total crystallinity being enhanced. Therefore, solvents having such a large affinity that they can dissolve polyolefin crystals at the heat treatment temperature zone are excluded.

Additionally, to have some affinity for a high molecular weight polyolefin means to be sufficiently attracted by the film of high molecular weight polyolefin and may be rephrased to have a small surface tension. As a general guide, liquids having a contact angle of up to 100 degrees, preferably up to 90 degrees, more preferably up to 80 degrees may be employed. (Additionally, the surface tension may be measured in a conventional manner using a commercially available automatic contact angle-measuring meter.)

Liquids not dissolving crystals of high molecular weight polyolefin at the heat treating temperature are those which, when melting point of the high molecular weight polyolefin is measured in a second-run manner in the presence of the liquid using a differential scanning calorimeter (DSC) equipped with a solution cell, the high molecular weight polyolefin in the presence of the liquid shows a melting point not lower than the melting point thereof in the absence of the liquid by 20° C. Since affinity of the liquid for the high molecular weight polyolefin varies depending upon the treating temperature, a proper affinity can be obtained by properly selecting the treating temperature and the kind of the liquid, thus the effect of rendering microporous being made maximal.

As such first liquid, there are illustrated lower aliphatic alcohols such as ethanol, propanol, butyl alcohol, amyl alcohol, etc.; lower aliphatic ketones such as acetone, methyl ethyl ketone, cyclohexanone, etc.; lower aliphatic esters such as ethyl formate, butyl acetate, etc.; halogenated hydrocarbons such as carbon tetrachloride, trichloroethylene, perchloroethylene, chlorobenzene, etc.; hydrocarbons such as heptane, cyclohexane, octane, decane, dodecane, etc.; nitrogen-containing organic compounds such as pyridine, formamide, dimethylformamide, etc.; and ethers such as methyl ether, ethyl ether, dioxane, butyl cellosolve, etc. In addition, glycols such as monoethylene glycol, diethylene glycol, triethylene glycol, etc. and silicone oils generally used as heating medium are preferred liquids.

These liquids may be used as a mixture of two or more of them. Further, warm or hot water containing a surfactant is also effective, but benzene, xylene and tetralin are not preferred because they dissolve the high molecular weight polyolefin at the heat treating temperature.

Preferred first liquids for polyethylene and polypropylene are octane, decane, dodecane, paraffin oil, melted paraffin wax, liquids containing these as major component, and a composition containing at least one of these.

The heat treating temperature varies depending upon the kind of polyolefin and the kind of the liquid. However, as a general guide, it is usually 100° to 145° C., preferably 115° to 140° C. with a polyethylene film, and usually 50° to 150° C., preferably 80° to 140° C. with a polyolefin film other than the polyethylene film, as has been mentioned hereinbefore. In general, treating time is 10 seconds to 10 minutes, preferably 30 seconds to 5 minutes, after temperature of the precursor film reaches the treating temperature, with the treating time being made shorter as the treating temperature increases. Additionally, a longer treating time than is necessary should be avoided since the resulting microporous film might have a decreased tensile strength.

Since precursor films formed by an inflation machine are tubular films taken up through pinch rolls, they are cut into a single sheet film before the heat treatment and the additional and optional stretch treatment. The inflation films are advantageous in yield in comparison with T-die extrusion films, because they need not be cut off (or trimmed) at both ends.

[Immersion into a Low-boiling Liquid and Drying]

The film heat treated in the first liquid is then dried. When the film is in a state of being fixed in two directions crossing at right angles to avoid film shrirnkage, the liquid may be removed by directly drying with warm or hot air, though depending upon the kind of the liquid used. However, where the liquid may be dried at a comparatively slow rate, it is preferred to immerse the film, before drying, in a second liquid having a boiling point lower than that of the first liquid and less affinity for polyolefins than the first liquid. In addition, the treated film is being fixed till it is dried in preferably at least one direction, most preferably in two directions crossing at right angles, to prevent film shrinkage. Where shrinkage is unavoidable, tolerance limits as to shrinkage are 10% in both the longitudinal and transverse direction.

As the second liquid to be used, there are illustrated, for example, low-boiling hydrocarbons such as hexane, heptane, etc.; chlorine-substituted, low-boiling hydrocarbons such as 1,2-dichloro-2,2,2-trifluoroethane, 1,1-dichloro-1-fluoroethane, 1,3-dichloro-1,1,2,2,3-pentafluoropropane, 2,2,3,3,3-pentafluoropropanol, etc.; and the like. As to the immersing temperature and immersing time, the lowest temperature and the shortest time are selected among the conditions for the first liquid to be completely replaced by the second liquid.

The thus dried microporous film may be heat setting for the purpose of removing wrinkles of the film, adjustment of void content or film thickness, or reduction of coefficient of surface friction of the film. As to conditions of heat setting, treating temperature and treating time may properly be selected under an atmosphere of a gas (air).

[Stretching]

In the process of the present invention which comprises subjecting a gas-impermeable polyolefin precursor film of high molecular weight polyolefin containing substantially no plasticizers and/or solvents and having an intrinsic viscosity, [η], of 4 dl/g or more to a heat treatment in a constrained state to render the film microporous, stretch treatment may be conducted simultaneously with, or before or after, the heat treatment to obtain a microporous film with a more tensile strength or to adjust void content or pore size.

The stretching is conducted at a temperature not higher than the melting point of the precursor film. The lower limit of the stretching temperature depends upon the kind of high molecular weight polyolefin, but is generally about melting point of the precursor film −40° C. When the high molecular weight polyolefin is polyethylene, the stretching temperature is 100° to 145° C. With uniaxial stretching, the stretch ratio is 150% or more, preferably 150 to 500%. When uniaxial stretching is employed, uniaxial stretching with a constant width is preferred. When biaxial stretching is employed, the stretch ratio is 150% or more, preferably 150 to 2,500%, in terms of areal ratio.

The stretching may be conducted under the atmosphere of air or, as has been described in the above description on heat treatment, in contact with the first liquid which has a proper affinity for high molecular weight polyolefin and which does not dissolve the polyolefin precursor film at the stretching temperature.

As stretching method, there may be employed uniaxial stretching with minimizing shrinkage in the transverse direction; uniaxial stretching with preventing shrinkage in the transverse direction using tenter clips; sequential or simultaneous biaxial stretching using tenter clips as conducted in an ordinary biaxially stretching testing apparatus; continuous and sequential biaxial stretching wherein a first step stretching is conducted by using a pair of rolls and then a second step stretching is conducted in the transverse direction using tenter clips; or continuous and simultaneous biaxial stretching in a continuous tenter clip manner.

[Microporous Film of High Molecular Weight Polyolefin]

Since the microporous film of high molecular weight polyolefin obtained by the present invention contains leaf vein-like fibrils as a main component on each of which fibrils indeterminate-form crystallites having a size of up to 1 μm flocculate, it has well-balanced tensile strength of 0.05 GPa or more, preferably 0.08 GPa or more, and gas impermeability-acquiring temperature of up to 140° C., preferably 130° to 137° C., that cannot be attained by conventional microporous film of polyolefin.

Figure 2A:
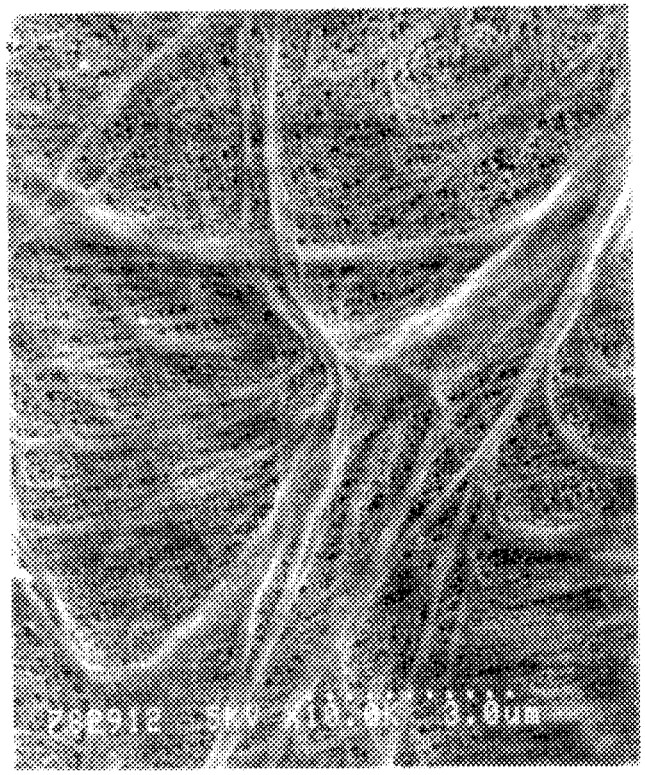
FIG. 2a is an electron micrograph of a microporous film of high molecular weight polyolefin, obtained in Experimental No. 59 in Experiment Example 11 of this invention, in which crystallites flocculate on leaf vein-like fibrils (at a magnification of 10,000).

The high tensile strength of the film is obtained by the leaf vein-like fibril structure, and the low gas impermeability-acquiring temperature results from the fact that, when heated, crystallites having flocculated on each fibril melt at a temperature lower than the melting point of the leaf vein-like fibrils and close the micropores. The state wherein indeterminate-form crystallites of 1 μm or less in size flocculate on each fibril is that shown by appended FIG. 2a which shows an electron photograph of the surface of the film, FIG. 3a which shows an electron photograph of the backside of the film, FIG. 2b which shows a tracing of FIG. 2a, and FIG. 3b which shows a tracing of FIG. 3a.

Figure 2B:
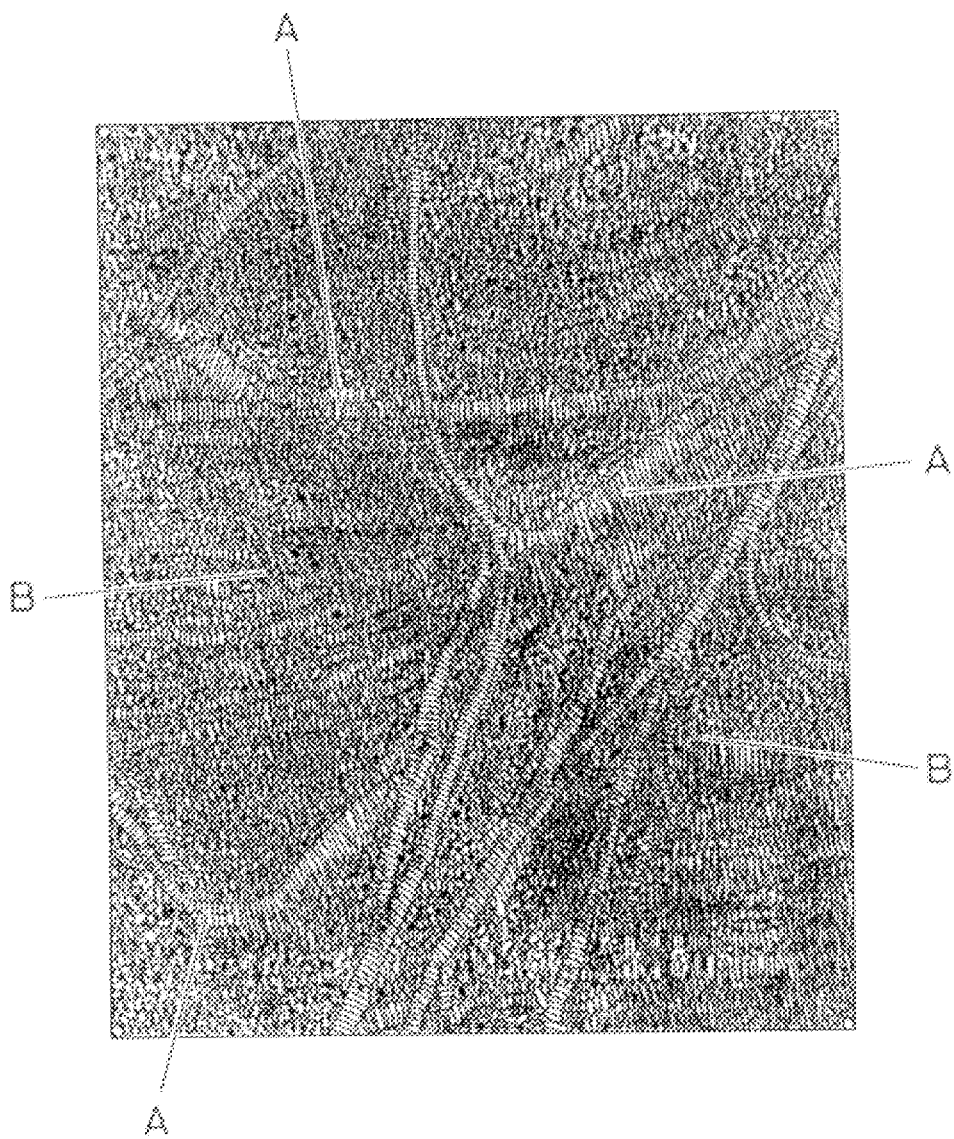
FIG. 2b is a tracing of the electron micrograph of FIG. 2a, in which A represents leaf vein-like fibrils, and B represents a state how crystallites flocculate.
Figure 3A:
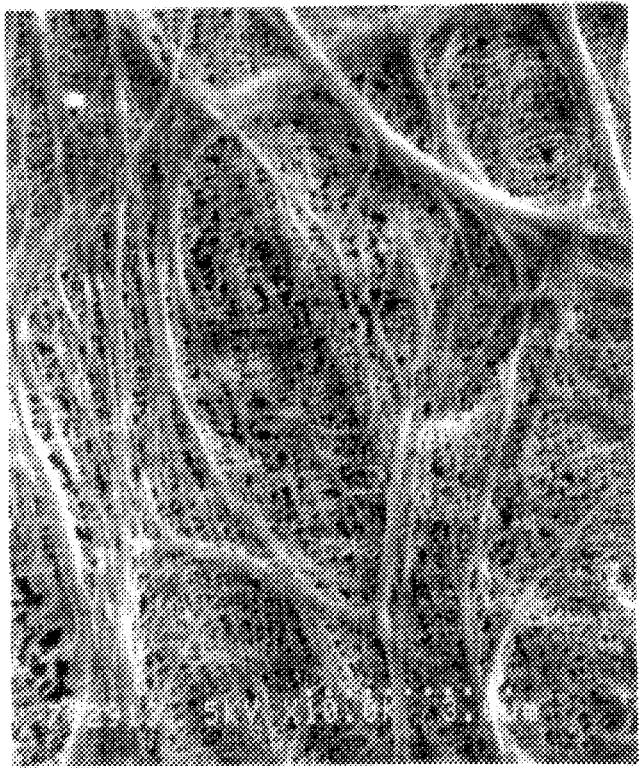
FIG. 3a is an electron micrograph of the backside of microporous film of high molecular weight polyolefin shown in FIG. 2a (at a magnification of 10,000).
Figure 3B:
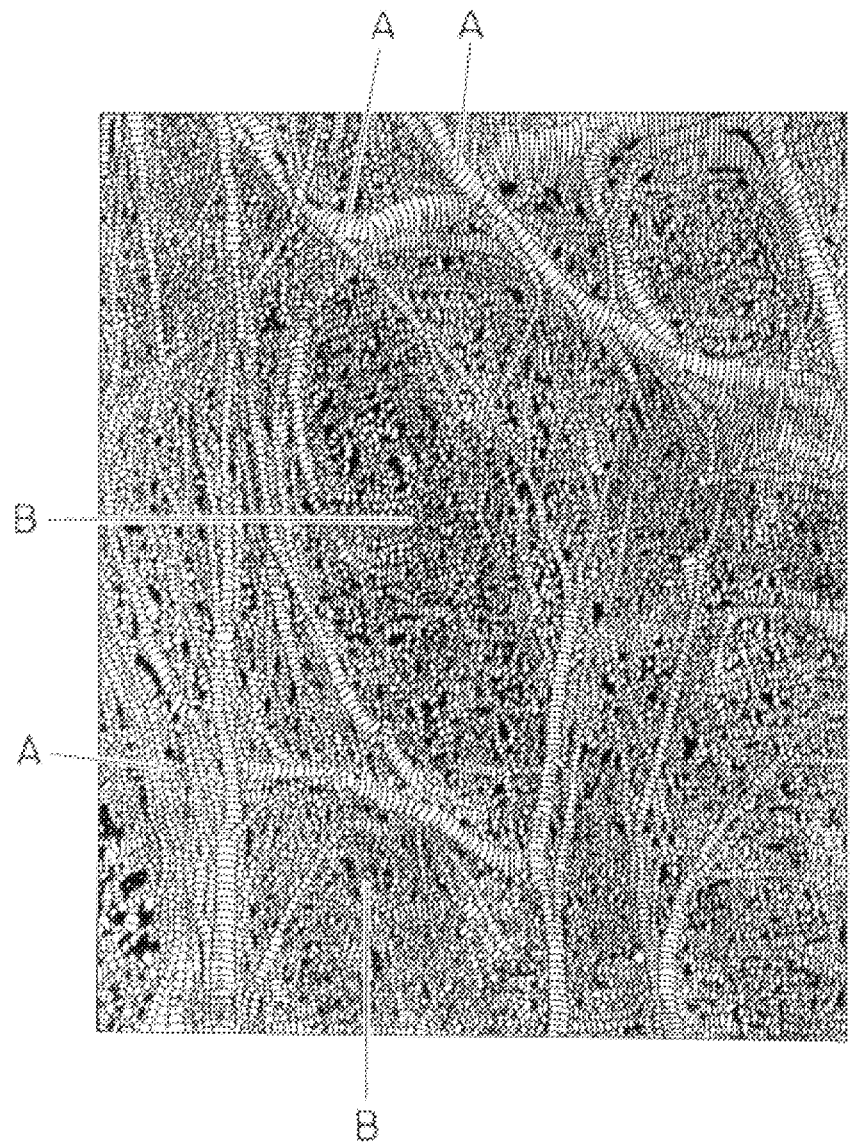
FIG. 3b is a tracing of the electron micrograph of FIG. 3a, in which A represents leaf vein-like fibrils, and B represents a state how crystallites flocculate, as in FIG. 2b.

As can be clearly seen from FIGS. 2b and 3b, the microporous film of high molecular weight polyolefin in accordance with the present invention has crystallites (B) flocculating on respective leaf vein-like fibrils (A).

The microporous film of the present invention has an excellent strength, particularly tensile strength, in spite of its microporous structure.

Void content of the film can properly be selected in the range of from about 30 to about 60% by properly conducting the heat treatment and, if necessary, the stretch treatment of the precursor film. Gas permeability is 1900 sec/100 cc or less in terms of the Gurley value, preferably 1500 sec/100 cc or less.

Tensile strength of the film is 0.05 GPa or more, preferably 0.08 GPa or more, even in the direction where the film has the lowest tensile strength, calculated based on the actual sectional area of the film.

Therefore, the microporous film of high molecular weight polyolefin in accordance with the present invention also has the following features.

That is, the microporous film of the present invention has:

(a) a void content of 25% or more, preferably 30% or more;

(b) a gas permeability of 1900 sec/100 cc or less, preferably 1500 sec/100 cc or less;

(c) a tensile strength of 0.05 GPa or more, preferably 0.08 GPa or more;

(d) a gas impermeability-acquiring temperature of 140° C. or lower, preferably 130° to 137° C.; and (e) an intrinsic viscosity, [η], of 4 dl/g or more, more preferably 4 to 25 dl/g.

These characteristic properties are measured according to the following manner.

[Intrinsic Viscosity]

The intrinsic viscosity used in this specification is a value measured in a decalin solvent at 135° C. The measurement is conducted according to ASTM D4020.

[Measurement of Film Thickness]

Film thickness was measured by means of a film thickness-measuring apparatus, Miniax (model DH-150) made by Tokyo Seimitsu Kabushiki Kaisha.

[Average Pore Size]

The average pore size is determined as a maximum value of pore sizes measured by means of a mercury porosimeter (Model Autoscan 33) made by Yuasa-Ionics Sha.

[Void Content]

A sample film was weighed, and a thickness as a dense film was determined by calculation taking density of the polymer as 0.95 g/cm³. The void content was determined based on the relation with the value determined by the film thickness-measuring apparatus according to the following formula:

$$\text{Void content (volume \%)} = \frac{T_o - T_w}{T_o} \times 100$$

wherein $T_o$ represents thickness of the actual film measured by the film thickness-measuring apparatus, and $T_w$ represents thickness of an imaginary film of 0% in void content determined by calculation based on the measured weight.
[Tensile Strength]

The tensile strength was measured at a room temperature (23° C.) using a tensile strength tester, Tensilon (model RTM100), made by Orientec Sha according to ASTM D882, method A (width of sample: 15 mm).
[Measurement of Gas Permeability (Gurley Test)]

The gas permeability was measured according to ASTM D726 using a standard Gurley Densometer (Gurley densometer, model B, made by Toyo Seiki Seisakusho).
[Measurement of Melting Point]

The melting point used in this invention is a value measured according to ASTM D3417 using a differential scanning calorimeter (DSC).
[Crystallinity]

The crystallinity used in this invention is determined by calculation as a ratio of the heat of fusion, simultaneously measured upon measuring the melting point according to ASTM D3417 using the differential scanning calorimeter (DSC), to a theoretical heat of fusion of crystal.
[Measurement of Orientation Coefficient]

The orientation coefficient was measured by means of an X-ray diffraction apparatus (model no. RU300) made by Rigaku Denki Kabushiki Kaisha.
[Gas Impermeability-acquiring Temperature]

A 1 mole/liter solution of anhydrous lithium perchlorate in a solvent of propylene carbonate having been dehydrated with molecular sieves (4A; made by Wako Junyaku) was prepared under an atmospsphere of dry nitrogen (water content: up to 50 ppm), and a sample film was impregnated with this solution using reduced pressure operation. This film was then sandwitched between nickel electrodes, and volume resistivity of the film was measured using an impedance meter (made by Mita Musen Kenkyujo; model D-52S) while increasing the temperature. The apparatus and the method for the measurement were based on the report of Laman et al. (F. C. Laman et al., J. Electrochem. Soc., Vol.140, 51–53 (1993)).

The volume resistivity of the film at room temperature (23° C.) was taken as the volume resistivity of the film and, when the sample film temperature was raised, the resistivity sharply increased at a certain temperature which was determined to be the gas impermeability-acquiring temperature.

The following Examples more specifically illustrates the present invention. In view of the fact that these examples are given for illustrative purposes only, they should not, in any way, be construed as limiting the invention thereto.

EXAMPLES

In the following descriptions, "%" is "% by weight" unless otherwise specified.

Experiment Example 1
[Preparation of Precursor Film]

An inflation film of high molecular weight polyethylene was prepared using an inflation apparatus shown in FIG. 1 and having the specifications shown in Table 1.

TABLE 1

| Specification Item | Specification Content |
| --- | --- |
| Outer diameter of screw (D) | 30 mmφ |
| Effective length of screw (L/D) | 34 |
| Flight pitch | 20 mm |
| Screw compression ratio | 1.8 |

TABLE 1-continued

| Specification Item | Specification Content |
| --- | --- |
| Length of adapter | 200 mm |
| Length of tube die | 550 mm |
| Inner diameter of outer die at die outlet | 22 mmφ |
| Outer diameter of mandrel at die outlet | 18 mmφ |
| S1/S2 | 1.40 |
| S2/S3 | 1.57 |
| Gas passage inside screw | 6 mmφ |
| Inner diameter of cooling ring | 140 mm |

In Table 1, S1 represents a sectional area of the resin passage at a tube die inlet 4, S2 represents a sectional area of the resin passage at a tube die middle portion 5, and S3 represents a sectional area of the resin passage at a tube die outlet 6.

As a starting polyethylene, powdery polyethylene (intrinsic viscosity [η], of 16.5 dl/g; bulk density=0.45 g/cm$^3$) was used. Temperatures of an extruder 1, a die center 2, and a die outlet 3 were set at 280° C., 180° C., and 150° C., respectively. Extrusion rate was set at about 3 kg/hr, and a compressed air was blown through a gas passage within a screw. The blown tubular film was then brought into contact with the inside surface of a cooling ring 7 having a bore diameter fitted for the diameter of the tubular film to cool and set the film, and, at the same time, the cooled and set film was folded along a stabilizing plate 8 and taken up by pinch rolls 9 at a predetermined rate. Thus, there was formed an inflation film of polyethylene.

The cooling ring was properly changed to one having a proper inner diameter depending upon blow-up ratio.

Film-forming conditions and characteristic properties of the thus obtained film are shown in Table 2.

TABLE 2

| Sample | Characteristic Properties of Film | |
| --- | --- | --- |
| Experiment No. 1 | Film thickness (μm) | 37.4 |
| | Tensile strength (GPa) | |
| | MD | 0.21 |
| | TD | 0.31 |
| | Intrinsic viscosity [η] of precursor film | 7.4 |
| | Crystallinity (%) | 62.9 |
| | Orientation coefficient | |
| | fa | 0.44 |
| | fc | −0.02 |

MD: machine direction
TD: transverse direction (cross machine direction)
fa: measured by irradiating X-rays from the "end" direction
fc: measured by irradiating X-rays from the "through" direction Experiment Example 2
[Rendering Microporous]

Film samples obtained in Experiment Example 1 were rendered microporous by conducting uniaxial stretching with a constant width and sequential biaxial stretching under the conditions shown in Table 3 in a silicone oil (made by Toshiba Silicone Kabushiki Kaisha; TSF451-200) using a tenter clip type biaxially stretching machine. Stretching was initiated about 5 minutes after immersing the sample into a heat treating bath kept at a predetermined temperature. Stretching rate was constant, with the initial rate being 500%/min in distortion rate based on the sample length.

Conditions for rendering the films microporous and thereof are shown in Tables 3 and 4. In the biaxial stretching was conducted under sequential biaxial conditions unless otherwise specified. Uniaxial stretching in which MD or TD was 1.0 was conducted as uniaxial stretching with constant width.

TABLE 3

| Experiment No. | Treating Temp. (°C.) | Stretch Ratio MD | Stretch Ratio TD | Gas Permeability sec/100 cc | Gas Imperme- ability- acquiring Temp. (°C.) |
|---|---|---|---|---|---|
| 2 | 120 | 1.5 | 1.0 | — | — |
| 3 | 120 | 1.0 | 1.5 | — | — |
| 4 | 130 | 3.2 | 1.0 | 1060 | 135 |
| 5 | 130 | 1.5 | 1.5 | 970 | 136 |
| 6 | 130 | 2.0 | 2.0 | 830 | 137 |
| 7 | 140 | 3.2 | 1.0 | 1170 | 135 |
| 8 | 145 | 3.6 | 1.0 | >10000 | |

Gas permeability: Gurley second (hereinafter the same)

TABLE 4

| Experiment No. | Film Thickness (μm) | Void Content (%) | Tensile Strength (GPa) MD | Tensile Strength (GPa) TD | Elongation (%) MD | Elongation (%) TD |
|---|---|---|---|---|---|---|
| 2 | — | 0 | — | — | — | — |
| 3 | — | 0 | — | — | — | — |
| 4 | 21.1 | 36.5 | 0.32 | 0.11 | 21 | 128 |
| 5 | 32.1 | 38.3 | 0.17 | 0.19 | 32 | 54 |
| 6 | 19.7 | 42.6 | 0.25 | 0.28 | 16 | 23 |
| 7 | 15.3 | 26.8 | 0.39 | 0.13 | 15 | 136 |
| 8 | 11.3 | 18.3 | — | — | — | — |

In this experiment example, good microporous films were obtained by heat treatment at 130° to 140° C.

Experiment Example 3

Inflation film samples obtained in Experiment Example 1 were subjected to heat treatment for 5 minutes in n-decane while being fixed to avoid film shrinkage. The thus treated film samples were dipped into n-hexane to dry at room temperature.

The properties of the resulting treated and dried film samples were as shown in Tables 5-1 and 5-2.

TABLE 5-1

| Experi- ment No. | Treating Temp. (°C.) | Treating Time (min) | Film Thick- ness (μm) | Void Con- tent (%) | *1 | Tensile strength (GPa) MD | Tensile strength (GPa) TD |
|---|---|---|---|---|---|---|---|
| 9 | 113 | 5 | 38.2 | 0 | >10000 | 0.25 | 0.32 |
| 10 | 123 | 5 | 63.2 | 34.3 | 7200 | 0.24 | 0.28 |

*1: gas permeability (sec/100 cc)

TABLE 5-2

| Experi- ment No. | Elong- ation (%) MD | Elong- ation (%) TD | Gas Impermeability- acquiring Temp. (°C.) | Crystallinity (%) | Orientation Coefficient fa | Orientation Coefficient fc |
|---|---|---|---|---|---|---|
| 9 | 131 | 96 | — | 66.1 | 0.53 | 0.02 |
| 10 | 126 | 85 | unmeasurable | 78.1 | 0.61 | 0.09 |

In this Experiment, good microporous films were not obtained due to low treating temperatures.

Experiment Example 4

Inflation films having been heat-treated in n-decane in Experiment Example 3 were directly subjected to stretch in n-decane without drying, thus being rendered microporous.

The thus obtained microporous film samples were immersed in n-hexane at room temperature as in Experiment Example 3, then dried. Treatment conditions and results thus obtained are shown in Tables 6 and 7.

TABLE 6

| Experi- mental No. | Experiment No. of Stretched Sample | Treating Temp. (°C.) | Stretch Ratio MD | Stretch Ratio TD | *1 | *2 |
|---|---|---|---|---|---|---|
| 11 | 9 | 113 | 1.8 | 1.0 | 6700 | unmeasurable |
| 12 | 9 | 113 | 2.0 | 2.0 | 830 | 137 |
| 13 | 10 | 123 | 2.1 | 1.0 | 1170 | 136 |
| 14 | 10 | 123 | 3.1 | 1.0 | 1360 | 136 |
| 15 | 10 | 123 | 2.0 | 2.0 | 440 | 137 |

*1: gas permeability (sec/100 cc)
*2* gas impermeability-acquiring temperature (°C.)

TABLE 7

| Experi- ment No. | Film Thick- ness (μm) | Void Content (%) | Tensile Strength (GPa) MD | Tensile Strength (GPa) TD | Elongation (%) MD | Elongation (%) TD |
|---|---|---|---|---|---|---|
| 11 | 47.6 | 38.0 | 0.17 | 0.15 | 37 | 154 |
| 12 | 23.9 | 52.7 | 0.30 | 0.18 | 18 | 155 |
| 13 | 35.0 | 46.6 | 0.30 | 0.14 | 16 | 125 |
| 14 | 24.3 | 48.1 | 0.18 | 0.10 | 13 | 87 |

In this Experiment Example, good microporous film samples were obtained by conducting additional stretch treatment at a stretch ratio of 2 or more subsequent to the procedure in Experiment Example 3.

Experiment Example 5

Heat-treated and dried film samples obtained in Experiment Example 3 (samples of Experiment No. 10) were subjected to the additional stretch treatment under the atmosphere of air to render them microporous. Treating conditions and results thus obtained are shown in Tables 8 and 9.

TABLE 8

| Experimental No. | Experiment No. of Stretched Sample | Treating Temp. (°C.) | Stretch Ratio MD | Stretch Ratio TD | *1 | *2 |
|---|---|---|---|---|---|---|
| 16 | 10 | 135 | 1.5 | 1.0 | 1820 | 135 |
| 17 | 10 | 135 | 2.0 | 1.0 | 960 | 136 |
| 18 | 10 | 135 | 3.1 | 1.0 | 720 | 137 |
| 19 | 10 | 135 | 2.0 | 2.0 | 650 | 137 |

*1: gas permeability (sec/100 cc)
*2* gas impermeability-acquiring temperature (°C.)

TABLE 9

| Experiment No. | Film Thickness (μm) | Void Content (%) | Tensile Strength (GPa) MD | Tensile Strength (GPa) TD | Elongation (%) MD | Elongation (%) TD |
|---|---|---|---|---|---|---|
| 16 | 47.4 | 37.7 | 0.16 | 0.17 | 42 | 136 |
| 17 | 37.4 | 40.4 | 0.32 | 0.16 | 42 | 186 |
| 18 | 23.7 | 46.1 | 0.28 | 0.15 | 15 | 134 |
| 19 | 20.1 | 48.7 | 0.35 | 0.24 | 18 | 126 |

In this Experiment Example, good microporous film samples were obtained by conducting additional stretch treatment at a higher temperature.

Experiment Example 6

Inflation film samples obtained in Experiment Example 1 were subjected to heat treatment in the air while being fixed to avoid film shrinkage. The thus treated film samples were dipped into n-hexane to dry at room temperature.

Treating conditions and the characteristic properties of the resulting film samples were as shown in Tables 10-1 and 10-2.

TABLE 10-1

| Experiment No. | Treating Temp. (°C.) | Treating Time (min) | Film Thickness (μm) | Void Content (%) | *1 | Tensile strength (GPa) MD | Tensile strength (GPa) TD |
|---|---|---|---|---|---|---|---|
| 20 | 140 | 720 | 39.0 | 0 | none | 0.22 | 0.34 |
| 21 | 140 | 1200 | 38.4 | 0 | none | 0.20 | 0.31 |
| 22 | 145 | 30 | 39.3 | 0 | none | 0.19 | 0.28 |

*1: gas permeability (sec/100 cc)

TABLE 10-2

| Experiment No. | Elongation (%) MD | Elongation (%) TD | Crystallinity (%) | Orientation Coefficient fa | Orientation Coefficient fc |
|---|---|---|---|---|---|
| 20 | 131 | 88 | 75.2 | 0.56 | -0.03 |
| 21 | 135 | 92 | 83.4 | 0.62 | 0.01 |
| 22 | 120 | 75 | 74.6 | 0.53 | -0.01 |

In this Experiment, good microporous films were not obtained since the heat treatment was conducted in the air.

Experiment Example 7

Inflation film samples having been heat-treated in the air in Experiment Example 6 were stretched in a silicone oil to render them microporous. The thus treated film samples were immersed in n-hexane at room temperature to dry.

Treating conditions and properties of the resulting film samples are shown in Tables 11 and 12.

TABLE 11

| Experimental No. | Experiment No. of Stretched Sample | Treating Temp. (°C.) | Stretch Ratio MD | Stretch Ratio TD | *1 | *2 |
|---|---|---|---|---|---|---|
| 23 | 20 | 130 | 2.8 | 1.0 | 940 | 137 |
| 24 | 21 | 130 | 3.4 | 1.0 | 1030 | 136 |
| 25 | 22 | 130 | 2.3 | 1.0 | 830 | 137 |

*1: gas permeability (sec/100 cc)
*2* gas impermeability-acquiring temperature (°C.)

TABLE 12

| Experiment No. | Film Thickness (μm) | Void Content (%) | Tensile Strength (GPa) MD | Tensile Strength (GPa) TD | Elongation (%) MD | Elongation (%) TD |
|---|---|---|---|---|---|---|
| 23 | 25.4 | 48.5 | 0.25 | 0.15 | 20 | 64 |
| 24 | 21.7 | 46.0 | 0.27 | 0.13 | 17 | 75 |
| 25 | 23.2 | 40.9 | 0.22 | 0.18 | 16 | 63 |

In this Experiment Example, good microporous film samples were obtained by conducting additional heat treatment subsequent to the procedure in Experiment Example 6.

Experiment Example 8

Film samples obtained in Experiment Example 1 were rendered microporous by conducting uniaxial stretching with a constant width and sequential biaxial stretching under the conditions shown in Table 13 in a butyl cellosolve (made by Wako Junyaku) using a tenter clip type biaxially stretching machine. Stretching was initiated about 5 minutes after immersing the sample into a heat treating bath kept at a predetermined temperature. Stretching rate was constant, with the initial rate being 500%/min in distortion rate based on the sample length.

The thus treated samples were immersed in n-hexane at room temperature to dry.

Conditions for rendering the films microporous and properties of the resulting samples are shown in Tables 13 and 14.

TABLE 13

| Experiment No. | Stretching Temp. (°C.) | Stretch Ratio MD | Stretch Ratio TD | Gas Permeability sec/100 cc | Gas Impermeability-acquiring Temp. (°C.) |
|---|---|---|---|---|---|
| 26 | 130 | 2.2 | 1.0 | 1500 | 135 |
| 27 | 130 | 2.0 | 2.5 | 730 | 137 |

Gas permeability: Gurley second (hereinafter the same)

TABLE 14

| Experiment No. | Film Thickness (μm) | Void Content (%) | Tensile Strength (GPa) MD | Tensile Strength (GPa) TD | Elongation (%) MD | Elongation (%) TD |
|---|---|---|---|---|---|---|
| 26 | 36.3 | 41.0 | 0.30 | 0.16 | 16 | 115 |
| 27 | 29.8 | 62.3 | 0.24 | 0.28 | 24 | 30 |

Comparative Experiment Example 1

[Preparation of Precursor Films]

Film samples were prepared under the following conditions using a general-purpose, inflation machine (made by Thermoplastic Sha; extruder: 30 mmø; L/D=25; take-up machine: model no. 4-18).

As a starting polyethylene, powdery polyethylene (intrinsic viscosity [η]=3.4 dl/g; bulk density=0.45 g/cm³, MRF=0.05) was used. Temperatures of an extruder, an adapter (AD), and a die were set at 200° C., 200° C., and 200° C., respectively. Inflation was conducted at a ratio of take-up rate of film to extrusion rate of resin within the die (draft ratio) of 16.7 and a blow-up ratio of about 2 to obtain an inflation film of high molecular polyethylene having a folded width of 200 mm and a thickness of about 60 μm.

Characteristic properties of the thus obtained film are shown in Table 15.

TABLE 15

| Sample | Characetristic Properties of Film | |
|---|---|---|
| Experiment No. 28 | Film thickness (μm) | 60.1 |
| | Tensile strength (GPa) | |
| | MD | 0.043 |
| | TD | 0.026 |
| | Crystallinity (%) | 73.0 |
| | Orientation coefficient | |
| | fa | 0.05 |
| | fc | 0.12 |

Comparative Experiment Example 2

[Rendering Microporous]

Film samples obtained in Comparative Experiment Example 1 were rendered microporous by conducting uniaxial stretching with a constant width and sequential biaxial stretching under the conditions shown in Table 16 in a silicone oil (made by Toshiba Silicone Kabushiki Kaisha; TSF451-200) using a tenter clip type biaxially stretching machine. Stretching was initiated about 5 minutes after immersing the sample into a stretching bath kept at a predetermined temperature. Stretching rate was constant, with the initial rate being 500%/min distortion rate based on the sample length.

Conditions for rendering the films microporous and characteristic properties of the resulting film samples are shown Tables 16 and 7.

TABLE 16

| Experiment No. | Stretching Temp. (°C.) | Stretch Ratio MD | Stretch Ratio TD | Gas Permeability sec/100 cc | Gas Impermeability-acquiring Temp. (°C.) |
|---|---|---|---|---|---|
| 29 | 130 | 2.5 | 1.0 | 1260 | 126 |
| 30 | 130 | 3.2 | 1.0 | 135 | 128 |
| 31 | 130 | 2.0 | 2.0 | 170 | 128 |

TABLE 17

| Experiment No. | Film Thickness (μm) | Void Content (%) | Tensile Strength (GPa) MD | Tensile Strength (GPa) TD | Elongation (%) MD | Elongation (%) TD |
|---|---|---|---|---|---|---|
| 29 | 53.0 | 52.0 | 0.063 | 0.016 | 85 | 1370 |
| 30 | 51.1 | 60.3 | 0.055 | 0.014 | 54 | 1450 |
| 31 | 51.4 | 65.1 | 0.036 | 0.032 | 75 | 175 |

Since the starting polyethylene used in this Comparative Experiment Example had an intrinsic viscosity, [η], of less than 4 dl/g, the resulting film samples showed a lower tensile strength.

Comparative Experiment Example 3

[Preparation of Precursor Films]

Pressed film samples were obtained by compression molding powdery polyethylene of high molecular weight (intrinsic viscosity: [η]=16.5 dl/g; bulk density=0.45 g/cm³) using a pair of stainless steel-made press plates and a 100-μ thick spacer.

Characteristic properties of the film samples are tabulated in the following Table 18.

TABLE 18

| Sample | Characetristic Properties of Film | |
|---|---|---|
| Experiment No. 32 | Film thickness (μm) | 100 |
| | Tensile strength (GPa) | |
| | MD | 0.052 |
| | TD | 0. 0048 |
| | Crystalinity (%) | 55.0 |
| | Orientation coefficient | |
| | fa | −0.06 |
| | fc | 0.03 |

[Heat Treatment]

Pressed film samples of Table 18 were subjected to heat treatment in a silicone oil under the following conditions. The treated film samples were washed with n-hexane at room temperature, then dried.

Heat-treating conditions and results of rendering the film samples are shown in Table 19.

TABLE 19

| Experiment No. | Treating Temp. (° C.) | Stretch Ratio MD | Stretch Ratio TD | Gas Permeability |
|---|---|---|---|---|
| 33 | 130 | 3.2 | 1.0 | none |
| 34 | 130 | 1.0 | 3.2 | none |
| 35 | 130 | 2.0 | 2.0 | none |
| 36 | 140 | 3.2 | 1.0 | none |
| 37 | 140 | 1.0 | 3.2 | none |

These film samples were subjected to heat treatment under various conditions but failed to be rendered microporous.

Comparative Experiment Example 4
[Preparation of Precursor Films]

Pressed film samples prepared in Experiment No. 32 were subjected to heat treatment at 120° C. for 3 hours in the air while being fixed to avoid film shrinkage. Characteristic properties of the film samples are tabulated in the following Table 20.

TABLE 20

| Sample | Characteristic Properties of Film | |
|---|---|---|
| Experiment No.32-1 | Film thickness ($\mu$m) | 97.0 |
| | Tensile strength (GPa) | |
| | MD | 0.055 |
| | TD | 0.048 |
| | Crystallinity (%) | 57.5 |
| | Orientation coefficient | |
| | fa | −0.04 |
| | fc | −0.00 |

[Heat Treatment]

Pressed film samples of Table 20 were subjected to heat treatment in a silicone oil under the following conditions. The treated film samples were washed with n-hexane at room temperature, then dried.

Heat-treating conditions and results of rendering the samples are shown in Table 21.

TABLE 21

| Experiment No. | Treating Temp. (° C.) | Stretch Ratio MD | Stretch Ratio TD | Gas Permeability |
|---|---|---|---|---|
| 38 | 130 | 3.2 | 1.0 | none |
| 39 | 130 | 1.0 | 3.2 | none |
| 40 | 130 | 2.0 | 2.0 | none |
| 41 | 140 | 3.2 | 1.0 | none |
| 42 | 140 | 1.0 | 3.2 | none |

These film samples were subjected to heat treatment under various conditions but failed to be rendered microporous.

Comparative Experiment Example 5
[Preparation of Precursor Films]

Precursor film samples were prepared under the following conditions. 31 Kg of powdery polyethylene of high molecular weight (intrinsic viscosity: [η]=16.5 dl/g; bulk density= 0.45 g/cm³) was placed in a metal mold of 320 mm/100 mm in outer diameter/inner diameter and 350 mm in length, and molding was conducted at a temperature of 200° C. for about 10 hours under pressure, followed by cooling for about 10 hours to obtain an ultra-high molecular weight polyethylene bullet of about the same dimension. Then, this bullet was skived by means of a skive machine to obtain a 100-$\mu$ thick skived film. Characteristic properties of the thus obtained film are shown in Table 22.

TABLE 22

| Sample | Characteristic Properties of Film | |
|---|---|---|
| Experiment No. 43 | Film thickness ($\mu$m) | 98 |
| | Tensile strength (GPa) | |
| | MD | 0.041 |
| | TD | 0.037 |
| | Crystallinity (%) | 64.8 |
| | Orientation coefficient | |
| | fa | 0.02 |
| | fc | 0.01 |

[Heat Treatment]

Skived film samples of Table 22 were subjected to heat treatment in a silicone oil under the following conditions. The treated film samples were washed with n-hexane at room temperature, then dried.

stretching conditions and results of rendering the film samples are shown in Table 23.

TABLE 23

| Experiment No. | Treating Temp. (°C.) | Stretch Ratio MD | Stretch Ratio TD | Gas Permeability |
|---|---|---|---|---|
| 44 | 130 | 3.2 | 1.0 | none |
| 45 | 130 | 1.0 | 3.2 | none |
| 46 | 130 | 2.0 | 2.0 | none |
| 47 | 140 | 3.2 | 1.0 | none |
| 48 | 140 | 1.0 | 3.2 | none |

These film samples were subjected to heat treatment under various conditions but failed to be rendered microporous.

Comparative Experiment Example 6
[Heat Treatment]

Inflation film samples of high molecular weight polythylene shown in Table 2 were stretched in decalin under the following conditions.

Stretching conditions and results of rendering the film samples are shown in Table 24.

TABLE 24

| Experiment No. | Treating Temp. (°C.) | Stretch Ratio MD | Stretch Ratio TD | Gas Permeability |
|---|---|---|---|---|
| 49 | 105 | 1.5 | 1.0 | — |
| 50 | 114 | 1.5 | 1.0 | — |
| 51 | 123 | dissolution of sample | | — |

In this Comparative Experiment Example, film samples were dissolved, thus good microporous film samples not being obtained.

Experiment Example 9
[Preparation of Precursor Film]

An inflation film of high molecular weight polyethylene was prepared using an inflation filming apparatus shown in FIG. 1 and having the specifications shown in Table 25.

TABLE 25

| Specification Item | Specification Content |
|---|---|
| Outer diameter of screw (D) | 60 mmφ |
| Effective length of screw (L/D) | 34 |
| Flight pitch | 36 mm |
| Screw compression ratio | 1.8 |
| Length of tube die | 830 mm |
| Inner diameter of outer die at die outlet | 36 mmφ |
| Outer diameter of mandrel at die outlet | 30 mmφ |
| S1/S2 | 1.40 |
| S2/S3 | 1.57 |
| Gas passage inside screw | 6 mmφ |

As a starting polyethylene, powdery polyethylene (intrinsic viscosity $[\eta]$=16.5 dl/g; bulk density=0.45 g/cm$^3$) was used. Temperatures of an extruder 1, a die center 2, and a die outlet 3 were set at 280° C., 180° C., and 150° C., respectively. Extrusion rate was set at about 3 kg/hr, and a compressed air was blown through a gas passage within a screw. The blown tubular film was then brought into contact with the inside surface of a cooling ring 7 having a bore diameter fitted for the diameter of the tubular film to cool and set the film and, at the same time, the cooled and set film was folded along a stabilizing plate 8 and taken up by pinch rolls 9 at a predetermined rate. Thus, there was formed an inflation film of polyethylene. The cooling ring was properly changed to one having a proper inner diameter depending upon blow ratio.

Filming conditions and characteristic properties of the thus obtained film are shown in Table 26.

TABLE 26

| Precursor Film Sample No. | | 1 | 2 |
|---|---|---|---|
| Film-forming Condition | Draft ratio | 20.7 | 19.3 |
| | Blow-up rato | 5.8 | 10 |
| Characteristic Properties | Film thickness (μm) | 23.5 | 15.0 |
| | Tensile strength (GPa) | | |
| of Film | MD | 0.32 | 0.27 |
| | TD | 0.18 | 0.30 |
| | Intrinsic viscosity [η] | 8.0 | 8.1 |
| | Crystaliinity (%) | 64.1 | 67.5 |
| | Orientation coefficient | | |
| | fa | 0.42 | 0.48 |
| | fc | 0.12 | −0.02 |
| | Gas permeability (sec/100 cc ) | >10000 | >10000 |

Experiment Example 10
[Rendering Microporous]

Precursor film samples obtained in Experiment Example 9 were subjected to the following heat treatment.

Figure 4:
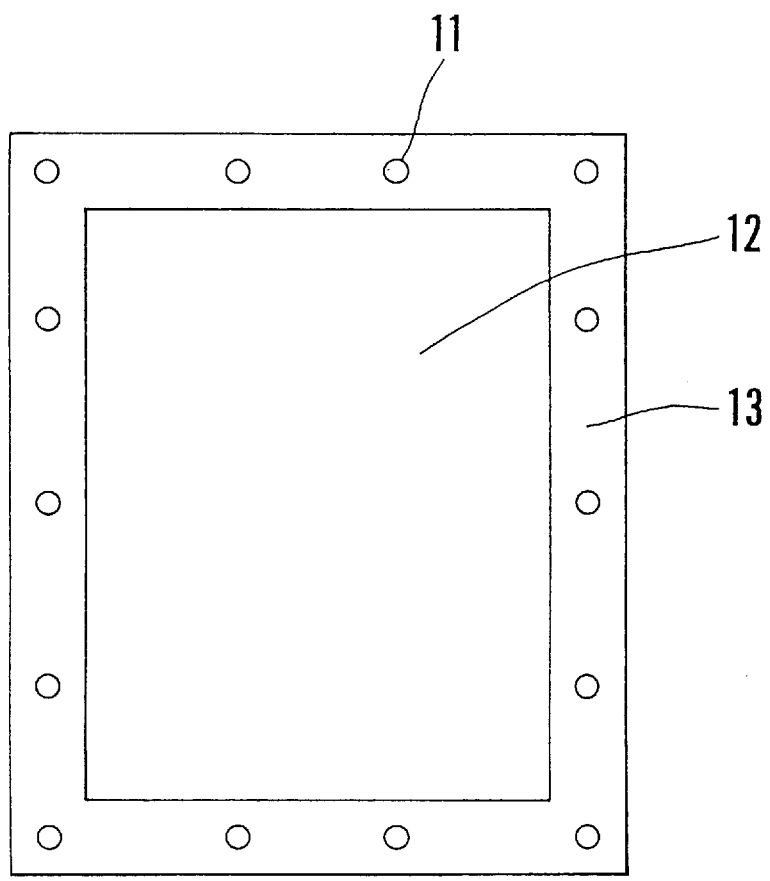
FIG. 4 shows an example of a metal frame for fixing a film upon heat treatment of the unstretched film according to this invention.

A precursor film 12 was sandwitched between a pair of stainless steel-made metal frames 13 as shown in FIG. 4, and the upper and lower metal frames were fixed by screws 11 to thereby fix the film sample in 4 directions. The sample was placed, in this state, in a bath filled with a heated liquid for heat treatment (first liquid) for a predetermined period of time.

(Immersion in a Second Liquid and Subsequent Drying)

After taking out of the heat-treating bath, the film sample was placed, in the frame-fixed state, in another bath filled with a second liquid. Then, it was taken out of the bath, and air-dried at room temperature (23° C.). The frame was then removed from the film sample to prepare a specimen for measurement.

Treating conditions and the results are shown in Tables 27-1, 27-2, 28-1 and 28-2.

TABLE 27-1

| | | Heat-treating Conditions | | |
|---|---|---|---|---|
| Experiment No. | Precursor Film No. | First Liquid | Treating Temp. (°C.) | Treating Time (min) |
| 52 | 2 | n-decane | 119 | 10 |
| 53 | 2 | n-decane | 120 | 10 |
| 54 | 2 | n-decane | 124 | 10 |

TABLE 27-2

| | Conditions for Immersion and Drying | | | |
|---|---|---|---|---|
| Experiment No. | Second Liquid | Immersing Time (min) | Immersing Temp. (°C.) | Drying Temp. (°C.) |
| 52 | methylene chloride | 10 | room temp. | air-dried at room temp. |
| 53 | methylene chloride | 10 | room temp. | air-dried at room temp. |
| 54 | methylene chloride | 10 | room temp. | air-dried at room temp. |

TABLE 28-1

| Experiment No. | Film Thickness (μ) | Void Content (%) | Gas Permeability (sec/100 cc) | Gas Impermeability-acquiring Temp. (°C.) | Tensile Strength (GPa) | |
|---|---|---|---|---|---|---|
| | | | | | MD | TD |
| 52 | 32.6 | 45.4 | 1400 | 130 | 0.17 | 0.11 |
| 53 | 41.5 | 51.6 | 1300 | 130 | 0.16 | 0.088 |
| 54 | 37.4 | 53.4 | 920 | 132 | 0.10 | 0.05 |

TABLE 28-2

| | Tensile strength (%) | | |
|---|---|---|---|
| Experiment No. | MD | TD | Crystallinity (%) |
| 52 | 88 | 87 | 79.3 |
| 53 | 57 | 95 | 81.2 |
| 54 | 60 | 92 | 83.8 |

Experiment Example 11

Precursor film samples obtained in Experiment Example 9 were rendered microporous according to Experiment Example 10. Treating conditions and results are shown in Tables 29-1, 29-2, 30-1 and 30-2.

TABLE 29-1

| Experiment No. | Precursor Film No. | First Liquid | Treating Temp. (°C.) | Treating Time (min) |
|---|---|---|---|---|
| | | Heat-treating Conditions | | |
| 55 | 3 | n-decane | 125 | 10 |
| 56 | 3 | n-decane | 125 | 1 |
| 57 | 3 | n-decane | 125 | 0.5 |
| 58 | 3 | n-decane | 128 | 10 |
| 59 | 3 | n-decane | 130 | 0.5 |
| 60 | 3 | n-decane | 120 | 1 |

TABLE 29-2

| Experiment No. | Second Liquid | Immersing Time (min) | Immersing Temp. (°C.) | Drying Temp. (°C.) |
|---|---|---|---|---|
| | | Conditions for Immersion and Drying | | |
| 55 | methylene chloride | 10 | room temp. | air-dried at room temp. |
| 56 | methylene chloride | 10 | room temp. | air-dried at room temp. |
| 57 | methylene chloride | 10 | room temp. | air-dried at room temp. |
| 58 | methylene chloride | 10 | room temp. | air-dried at room temp. |
| 59 | methylene chloride | 10 | room temp. | air-dried at room temp. |
| 60 | HFC225bc | 10 | room temp. | air-dried |

*HFC225bc: 1,3-dichloro-1,1,2,2,3-pentafluoropropane

TABLE 30-1

| Experiment No. | Film Thickness ($\mu$) | Void Content (%) | Gas Permeability (sec/100 cc) | Gas Impermeability-acquiring Temp. (°C.) | Tensile Strength (GPa) MD | Tensile Strength (GPa) TD |
|---|---|---|---|---|---|---|
| 55 | 19.7 | 32.5 | 1490 | 130 | 0.197 | 0.188 |
| 56 | 21.5 | 32.1 | 1500 | 130 | 0.189 | 0.174 |
| 57 | 19.8 | 31.3 | 1550 | 130 | 0.195 | 0.206 |
| 58 | 27.0 | 45.2 | 990 | 132 | 0.119 | 0.103 |
| 59 | 23.1 | 38.5 | 830 | 132 | 0.159 | 0.133 |
| 60 | 29.2 | 47.3 | 1080 | 131 | 0.112 | 0.091 |

TABLE 30-2

| Experiment No. | Tensile strength (%) MD | Tensile strength (%) TD | Crystallinity (%) |
|---|---|---|---|
| 55 | 56 | 60 | 82.6 |
| 56 | 56 | 65 | 81.7 |
| 57 | 59 | 65 | 83.3 |
| 58 | 54 | 64 | 83.2 |
| 59 | 54 | 58 | 82.4 |
| 60 | 58 | 69 | 81.6 |

Comparative Experiment Example 7

Precursor films obtained in Experiment Example 9 were rendered microporous according to Experiment Example 10. Treating conditions and results are shown in Tables 31-1, 31-2, 32-1 and 32-2.

TABLE 31-1

| Experiment No. | Precursor Film No. | First Liquid | Treating Temp. (°C.) | Treating Time (min) |
|---|---|---|---|---|
| | | Heat-treating Conditions | | |
| 61 | 3 | n-decane | 135 | 10 |
| 62 | 3 | n-decane | 140 | 1 |

TABLE 31-2

| Experiment No. | Second Liquid | Immersing Time (min) | Immersing Temp. (°C.) | Drying Temp. (°C.) |
|---|---|---|---|---|
| | | Conditions for Immersion and Drying | | |
| 61 | HFC225bc | 10 | room temp. | air-dried |
| 62 | HFC225bc | 10 | room temp. | air-dried |

TABLE 32-1

| Experiment No. | Film Thickness ($\mu$) | Void Content (%) | Gas Permeability (sec/100 cc) | Gas Impermeability-acquiring Temp. (°C.) | Tensile Strength (GPa) MD | Tensile Strength (GPa) TD |
|---|---|---|---|---|---|---|
| 61 | 39.0 | 63.0 | 560 | 134 | 0.03 | 0.02 |
| 62 | 17.8 | 12.9 | >10000 | — | — | — |

TABLE 32-2

| Experiment No. | Tensile Strength (%) MD | Tensile Strength (%) TD | Crystallinity (%) |
|---|---|---|---|
| 61 | 55 | 47 | 63.2 |
| 62 | — | — | 58.4 |

The optimal treating temperature varies depending upon the kind of starting material, conditions for forming precursor film, etc. However, a too high treating temperature might decrease tensile strength, and a higher treating temperature prevents the films from being rendered microporous.

Comparative Experiment Example 8

Precursor film samples obtained in Experiment Example 9 were made microporous according to the method described in Experiment 10. In this case, however, the samples were not immersed in the second liquid, but the first liquid of n-decane was removed from the film samples under tension by applying hot air thereto for 30 minutes.

Treating conditions and results are shown in Tables 33-1, 33-2, 34-1 and 34-2.

TABLE 33-1

| Experiment No. | Precursor Film No. | First Liquid | Treating Temp. (°C.) | Treating Time (min) |
|---|---|---|---|---|
| | | Heat-treating Conditions | | |
| 63 | 3 | n-decane | 128 | 1 |
| 64 | 3 | n-decane | 130 | 1 |
| 65 | 3 | n-decane | 132 | 1 |

TABLE 33-2

| | Conditions for Immersion and Drying | | | |
|---|---|---|---|---|
| Experiment No. | Second Liquid | Immersing Time (min) | Immersing Temp. (°C.) | Drying Temp. (°C.) |
| 63 | none | — | — | 60 |
| 64 | none | — | — | 60 |
| 65 | none | — | — | 60 |

TABLE 34-1

| Experiment No. | Film Thickness ($\mu$) | Void Content (%) | Gas Permeability (sec/100 cc) | Gas Impermeability-acquiring Temp. (°C.) | Tensile Strength (GPa) MD | TD |
|---|---|---|---|---|---|---|
| 63 | 19.5 | 29.2 | 2400 | unmeasurable | 0.028 | 0.029 |
| 64 | 20.0 | 27.7 | 2400 | unmeasurable | 0.025 | 0.027 |
| 65 | 18.5 | 25.4 | 2780 | unmeasurable | 0.024 | 0.027 |

TABLE 34-2

| | Tensile Strength (%) | | |
|---|---|---|---|
| Experiment No. | MD | TD | Crystallinity (%) |
| 63 | 54 | 62 | 62.3 |
| 64 | 50 | 60 | 60.1 |
| 65 | 48 | 52 | 58.5 |

When drying was conducted without immersion in the second liquid, there results deteriorated gas permeability, though films being rendered microporous.

Experiment Example 12

Precursor film samples obtained in Experiment Example 9 were rendered microporous according to the method described in Experiment Example 10. Treating conditions and results are in Tables 35-1, 35-2, 36-1 and 36-2.

TABLE 35-1

| | Heat-treating Conditions | | | |
|---|---|---|---|---|
| Experiment No. | Precursor Film No. | First Liquid | Treating Temp. (°C.) | Treating Time (min) |
| 66 | 3 | PO1 | 135 | 10 |
| 67 | 3 | PO1 | 135 | 1 |
| 68 | 3 | PO2 | 132 | 1 |
| 69 | 3 | PO2 | 135 | 1 |
| 70 | 3 | PO2 | 138 | 1 |
| 71 | 3 | PO2 | 135 | 10 |
| 72 | 3 | PO2 | 135 | 5 |

TABLE 35-2

| | Conditions for Immersion and Drying | | | |
|---|---|---|---|---|
| Experiment No. | Second Liquid | Immersing Time (min) | Immersing Temp. (°C.) | Drying Temp. (°C.) |
| 66 | methylene chloride | 10 | room temp. | air-dried at room temp. |

TABLE 35-2-continued

| | Conditions for Immersion and Drying | | | |
|---|---|---|---|---|
| Experiment No. | Second Liquid | Immersing Time (min) | Immersing Temp. (°C.) | Drying Temp. (°C.) |
| 67 | methylene chloride | 10 | room temp. | air-dried at room temp. |
| 68 | HFC225bc | 10 | room temp. | air-dried at room temp. |
| 69 | HFC225bc | 10 | room temp. | air-dried at room temp. |
| 70 | HFC225bc | 10 | room temp. | air-dried at room temp. |
| 71 | HFC225bc | 10 | room temp. | air-dried at room temp. |
| 72 | HFC225bc | 10 | room temp. | air-dried at room temp. |

PO1: paraffin oil (viscosity coefficient: cSt/40° C. = 61–64: trade name: Orzol) made by Witco Co.
PO2: paraffin oil (viscosity coefficient: cSt/40° C. = 11–14; trade name: Carnation) made by Witco Co.

TABLE 36-1

| Experiment No. | Film Thickness ($\mu$) | Void Content (%) | Gas Permeability (sec/100 cc) | Gas Impermeability-acquiring Temp. (°C.) | Tensile Strength (GPa) MD | TD |
|---|---|---|---|---|---|---|
| 66 | 20.9 | 35.4 | 1120 | 131 | 0.166 | 0.168 |
| 67 | 22.2 | 34.2 | 1440 | 130 | 0.170 | 0.175 |
| 68 | 21.5 | 36.7 | 1170 | 131 | 0.163 | 0.160 |
| 69 | 27.4 | 44.5 | 920 | 132 | 0.130 | 0.118 |
| 70 | 29.6 | 51.3 | 620 | 133 | 0.075 | 0.071 |
| 71 | 23.7 | 41.3 | 1150 | 130 | 0.131 | 0.135 |
| 72 | 26.6 | 43.2 | 1400 | 130 | 0.117 | 0.102 |

TABLE 36-2

| | Tensile strength (%) | | |
|---|---|---|---|
| Experiment No. | MD | TD | Crystallinity (%) |
| 66 | 51 | 58 | 82.5 |
| 67 | 55 | 58 | 83.6 |
| 68 | 50 | 64 | 84.2 |
| 69 | 60 | 57 | 81.4 |
| 70 | 63 | 68 | 79.2 |
| 71 | 61 | 62 | 82.7 |
| 72 | 55 | 56 | 84.2 |

Experiment Example 13

A precursor film sample of polyethylene was prepared according to the method described in Experiment Example 9. Intrinsic viscosity, film-forming conditions and characteristic properties of the precursor film are shown in Table 37.

TABLE 37

| Precursor Film Sample No. | | 3 |
|---|---|---|
| Intrinsic viscosity, [$\eta$], of starting polyethylene (dl/g) | | 8.8 |
| Film-forming condition | Draft ratio | 13.0 |
| | Blow-up ratio | 9.7 |
| Characteristic Properties | Film thickness ($\mu$m) | 19.8 |

TABLE 37-continued

| Precursor Film Sample No. | | 3 |
|---|---|---|
| of Film | Tensile strength (GPa) | |
| | MD | 0.117 |
| | TD | 0.182 |
| | Intrinsic viscosity [η] | 6.0 |
| | Crystallinity (%) | 62.6 |
| | Orientation coefficient | |
| | fa | 0.38 |
| | fc | −0.18 |
| | Gas permeability (sec/100 cc) | >10000 |

Then, the precursor film sample was rendered microporous according to the method described in Experiment Example 10. Treating conditions are shown in Tables 38-1 and 38-2, and results are shown in Tables 39-1 and 39-2.

TABLE 38-1

| | | Heat-treating Conditions | | |
|---|---|---|---|---|
| Experiment No. | Precursor Film No. | First Liquid | Treating Temp. (°C.) | Treating Time (min) |
| 73 | 3 | P02 | 128 | 1 |

TABLE 38-2

| | Conditions for Immersion and Drying | | | |
|---|---|---|---|---|
| Experiment No. | Second Liquid | Immersing Time (min) | Immersing Temp. (°C.) | Drying Temp. (°C.) |
| 73 | HFC225bc | 10 | room temp. | air-dried at room temp. |

TABLE 39-1

| Experiment No. | Film Thickness (μ) | Void Content (%) | Gas Permeability (sec/100 cc) | Gas Impermeability-acquiring Temp. (°C.) | Tensile Strength (GPa) MD | TD |
|---|---|---|---|---|---|---|
| 73 | 45.1 | 54.5 | 504 | 130 | 0.084 | 0.124 |

TABLE 39-2

| | Tensile strength (%) | | |
|---|---|---|---|
| Experiment No. | MD | TD | Crystallinity (%) |
| 73 | 131 | 156 | 78.3 |

According to the present invention, there is provided a microporous film with good tensile strength by subjecting a gas-impermeable, high molecular weight polyolefin film to heat treatment and, if necessary, to stretch treatment, with using substantially no plasticizers and/or solvents.

Furthermore, according to this invention, there is provided a microporous film of high molecular weight polyolefin containing leaf vein-like fibriles as a main constituent on each of which fibrils flocculate indeterminate-form crystallites of up to 1 μm in size. This structure serves to produce excellent strength and closing properties.

As the starting film, a biaxially oriented, high molecular weight polyethylene film formed by inflation method and having a crystallinity of 60% or more can provide much more excellent microporous film.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A microporous film of high molecular weight polyolefin having an intrinsic viscosity (η) of at least 4 dl/g and possessing the following characteristics:

(a) a void content of at least 25%, (b) a gas permeability of not more than 1900 sec/100 cc, (c) a tensile strength of at least 0.05 GPa in all directions, and (d) a gas impermeability-acquiring temperature of not more than 140° C.

2. A microporous film of high molecular weight polyolefin according to claim 1, wherein the film contains leaf vein-like fibrils as a predominant constituent and indeterminate-form crystallites of not more than 1 μm in size are flocculated on each of the fibrils.

3. A microporous film of high molecular weight polyolefin according to claim 1 obtained by subjecting a gas-impermeable polyolefin film substantially free of a plasticizer and/or a solvent and having an intrinsic viscosity (η) of at least 4 dl/g to heat treatment under restraint to render the film microporous.

4. A microporous film of high molecular weight polyolefin according to claim 3 wherein the gas-impermeable film is a film obtained by the inflation film shaping method.

5. A microporous film of high molecular weight polyolefin according to claim 4, wherein the high molecular weight polyolefin is a high molecular weight polyethylene.

6. A microporous film of high molecular weight polyolefin according to claim 1 obtained by subjecting a biaxially oriented gas-impermeable polyolefin film substantially free of a plasticizer and/or a solvent and having an intrinsic viscosity (η) of at least 5 dl/g to a heat treatment under stretching.

7. A microporous film of high molecular weight polyolefin according to claim 3 or 6, wherein the gas-impermeable film is a biaxially oriented film having a crystallinity of at least 60%.

8. A microporous film of high molecular weight polylefin according to claim 7, wherein the high molecular weight polyolefin is a high molecular weight polyethylene.

9. A microporous film of high molecular weight polyolefin according to claim 7, wherein the gas-impermeable film is a film obtained by the inflation film shaping method.

10. A microporous film of high molecular weight polyolefin according to claim 3 or 6, wherein the gas-impermeable film is a biaxially oriented film other than polyethylene and has a crystallinity of at least 40%.

11. A microporous film of high molecular weight polyolefin according to claim 10, wherein the gas-impermeable film is a film obtained by the inflation film shaping method.

12. A microporous film of high molecular weight polyolefin according to any one of the claims 1-6, wherein the high molecular weight polyolefin is a high molecular weight polyethylene.

* * * * *